(12) United States Patent
Ham

(10) Patent No.: US 9,563,592 B2
(45) Date of Patent: Feb. 7, 2017

(54) REMOTE TERMINAL DEVICE AND METHOD OF OPERATING THE SAME

(71) Applicant: LSIS CO., LTD., Anyang-si, Gyeonggi-do (KR)

(72) Inventor: Sung Sik Ham, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 312 days.

(21) Appl. No.: 14/325,076

(22) Filed: Jul. 7, 2014

(65) Prior Publication Data

US 2015/0026381 A1  Jan. 22, 2015

(30) Foreign Application Priority Data

Jul. 18, 2013  (KR) .................... 10-2013-0084548

(51) Int. Cl.
*G06F 13/40* (2006.01)
*G05B 19/05* (2006.01)
*G05B 19/042* (2006.01)

(52) U.S. Cl.
CPC ....... *G06F 13/4027* (2013.01); *G05B 19/0423* (2013.01); *G05B 19/054* (2013.01); *G05B 19/056* (2013.01); *G05B 19/0421* (2013.01); *G05B 2219/1103* (2013.01); *G05B 2219/1105* (2013.01); *G05B 2219/1159* (2013.01); *G05B 2219/25428* (2013.01)

(58) Field of Classification Search
CPC . G06F 13/4027; G05B 19/054; G05B 19/056; G05B 19/0423
See application file for complete search history.

(56) References Cited

U.S. PATENT DOCUMENTS 7,370,348 B1 * 5/2008 Patel .................. H04L 63/0485
 713/150
8,850,223 B1 * 9/2014 Helsel .................... G06F 21/72
 713/189

(Continued)

FOREIGN PATENT DOCUMENTS

KR  2010-0101991  9/2010

OTHER PUBLICATIONS

Korean Intellectual Property Office Application Serial No. 10-2013-0084548, Office Action dated Jul. 25, 2014, 3 pages.

(Continued)

*Primary Examiner* — Nimesh G Patel
(74) *Attorney, Agent, or Firm* — Lee, Hong, Degerman, Kang & Waimey

(57) ABSTRACT

Provided is a remote terminal device having an industrial versa module eurocard bus (VMEbus) structure and including a main module that receives control logic information of a field device from an input/output module, and a programmable logic controller (PLC) function module that receives the control logic information from the main module, performs a logic corresponding to the control logic information, and outputs a result of the performed logic. The PLC function module includes a dual port RAM including a plurality of memory areas, and a PLC chip that reads the control logic information written on one of the plurality of memory areas, performs the logic corresponding to the read control logic information, and outputs the result of the performed logic to another one of the plurality of memory areas.

2 Claims, 3 Drawing Sheets

(56) References Cited

U.S. PATENT DOCUMENTS

| | | | |
|---|---|---|---|
| 2003/0148793 A1* | 8/2003 | Sundararajan | G06F 9/24 455/561 |
| 2005/0203649 A1* | 9/2005 | Martin | G05B 19/052 700/87 |
| 2008/0184049 A1* | 7/2008 | Mathur | G06F 9/3869 713/320 |
| 2013/0066441 A1 | 3/2013 | Park | |

OTHER PUBLICATIONS

European Patent Office Application Serial No. 14176989.3, Search Report dated Feb. 26, 2015, 6 pages.
Brouwer, "The Linux Kernel: System Cells," http:web.archive.org/web/20130613100206/http://www.win.tue.nl/%7Eaeb/inux/lk-4.html, XP055219617, Jun. 2013, 9 pages.
European Patent Office Application Serial No. 14176989.3, Office Action dated Apr. 26, 2016, 6 pages.

* cited by examiner

REMOTE TERMINAL DEVICE AND METHOD OF OPERATING THE SAME

CROSS-REFERENCE TO RELATED APPLICATIONS

Pursuant to 35 U.S.C. §119(a), this application claims the benefit of earlier filing date and right of priority to Korean Patent Application No. 10-2013-0084548, filed on Jul. 18, 2013, the contents of which are hereby incorporated by reference herein in its entirety.

BACKGROUND

The present disclosure relates to a remote terminal device and a method of operating the remote terminal device, and more particularly, to a remote terminal device, which includes a programmable logic controller (PLC) control device having an industrial versa module eurocard bus (VMEbus) structure, and a method of operating the remote terminal device.

Facility controllers provided in industrial plants (such as gas plants, water and sewage plants, power plants, or water resource plants) include various sensors and devices for driving motors, and such sensors and devices can be easily operated remotely or on-site by an automatic inspection/control system.

In addition, such sensors and devices need a PLC function, such as process control, sequence control, or group control between device groups, under specific conditions.

Remote terminal devices (remote terminal units (RTUs)) used in the industrial plants have a PLC function. Such a remote terminal device receives mechanical/electrical signal information from various field devices disposed in a site, and converts the mechanical/electrical signal information into digital data. Then, the remote terminal device may use the digital data as input information of a PLC control logic, and output information of the PLC control logic is output as control information for the field devices, thereby appropriately operating a plant device and facility.

However, a typical software type PLC function may be applied to a remote terminal device, thereby negatively affecting a process performance of a main processor of the remote terminal device. In addition, when an operation speed and a memory margin are insufficient, a high level main module is needed, which increases costs.

SUMMARY

Embodiments provide a remote terminal device in which an additional hardware module has a compatible structure with a data bus method included in a typical system, without changing a typical hardware data bus structure, so as to apply a PLC function to a remote terminal device used in the field of industrial plants.

Embodiments also provide a remote terminal device used in an industrial plant and including a PLC function module providing a PLC control function, without affecting a performance such as a software process speed.

In one embodiment, a remote terminal device has an industrial versa module eurocard bus (VMEbus) structure and includes: a main module that receives control logic information of a field device from an input/output module; and a programmable logic controller (PLC) function module that receives the control logic information from the main module, performs a logic corresponding to the control logic information, and outputs a result of the performed logic, wherein the PLC function module includes a dual port RAM including a plurality of memory areas, and an PLC chip that reads the control logic information written on one of the memory areas, performs the logic corresponding to the read control logic information, and outputs the result of the performed logic to another one of the memory areas.

The memory areas of the dual port RAM may include an input variable area on which a value of an input variable is read or written, and an output variable area on which a value of an output variable is read or written.

The main module may write the received control logic information on the input variable area, and the PLC chip may read the value of the input variable written on the input variable area, and perform a logic corresponding to the read value of the input variable by using the read value of the input variable.

The PLC chip may write a result of the performed logic on the output variable area of the dual port RAM, and the main module may read the value of the output variable written on the output variable area.

The input variable area may include a first input variable area on which a value of an input bit variable is read or written, and a second input variable area on which a value of an input word variable is read or written, and the output variable area may include a first output variable area on which a value of an output bit variable is read or written, and a second output variable area on which a value of an output word variable is read or written.

According to various embodiments, although a PLC control logic (IEC61131-3) function is provided, a data bus hardware structure of a typical product can be used.

In addition, since a PLC function module uses a VMEbus method used in a typical remote terminal device, a bus system structure of the typical remote terminal device can be used.

In addition, a VMEbus slave type PLC function module is used to ensure a process performance of a main module of a remote terminal device and construct a reliable PLC control system based on the remote terminal device.

In addition, burden of replacing hardware of a main module included in a remote terminal device is eased.

DETAILED DESCRIPTION OF THE EMBODIMENTS

Hereinafter, embodiments will be described in detail with reference to the accompanying drawings. Terms "module" and "part" used for expressing components set forth in the following description are merely intended for easy description of the specification, and the terms themselves do not give any special meaning or function.

Hereinafter, a device having a VMEbus master function, and a device having a VMEbus slave function stand in the relation of master and servant. While the device having the VMEbus slave function performs a time requiring process, the device having the VMEbus master function may perform another process.

A remote terminal device has a high calculation speed, a high capacity memory, and a VMEbus slave function.

Figure 1:
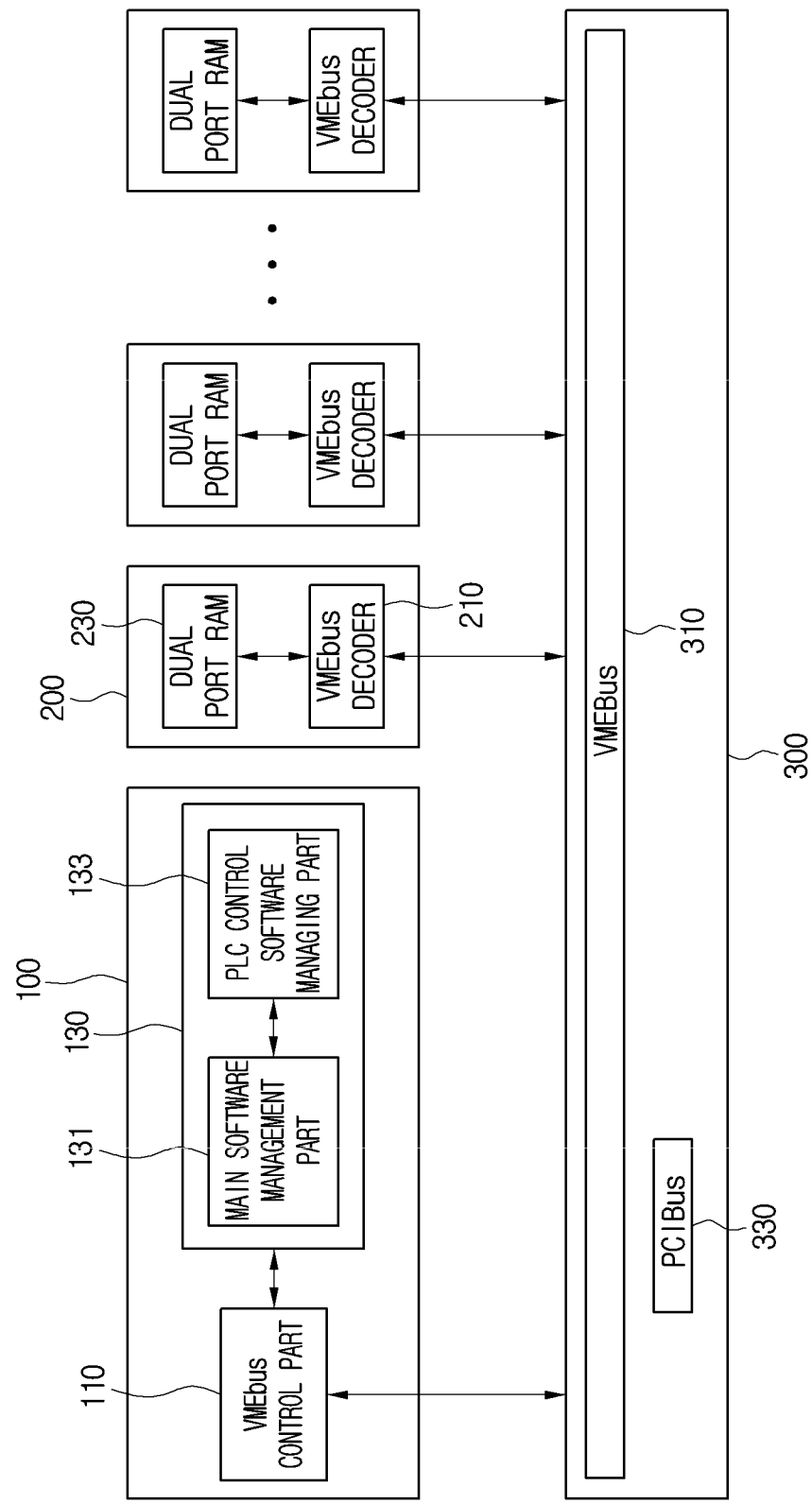
FIG. 1 is a block diagram illustrating a remote terminal device according to an embodiment.

FIG. 1 is a block diagram illustrating a remote terminal device according to an embodiment.

In particular, FIG. 1 is a block diagram illustrating a remote terminal device 10 having a communication control function and including a software type PLC.

A bus-connected hardware configuration method for components of the remote terminal device 10 may be a method of connecting components for supporting a VMEbus method, to a backplane board. A VMEbus as an industrial standard bus may have a bus backbone structure.

Most of rack type systems having a multi plug-in module structure may have an appropriate data bus structure for data communications between modules. A data bus structure may have a parallel bus structure and a serial bus structure. A VMEbus may correspond to a parallel bus structure and be applied mainly to an industrial bus structure to provide economical high speed data communication.

Referring to FIG. 1, a configuration of the remote terminal device 10 having a communication control function and including the software type PLC will now be described in detail.

The remote terminal device 10 may include a main module 100, a plurality of input/output modules 200, and a backplane board 300.

The main module 100 may perform a VMEbus master function. In particular, the main module 100 may perform a VMEbus master function on each of the input/output modules 200 performing a VMEbus slave function.

The main module 100 may include a VMEbus control part 110 and a processor 130.

The VMEbus control part 110 may sense a collision between buses. The VMEbus control part 110 may sense a collision between buses to transmit a state of the collision to the processor 130. The VMEbus control part 110 may function as a mediator between buses.

The processor 130 may control the overall operation of the main module 100.

The processor 130 may manage the main module 100 through main software and PLC control software The processor 130 may include a main software managing part 131 and a PLC control software managing part 133.

The main software managing part 131 may control the overall operation of the main module 100 through the main software. The main software managing part 131 may receive data from each of the input/output modules 200 operating as VMEbus slaves. The data received from each of the input/output modules 200 may relate to state information denoting a current state of a field device disposed in an industrial site.

The PLC control software managing part 133 may perform a process control function, a sequence control function, a feedback loop control function, and an interlocking control function on field devices disposed in an industrial site, through the PLC control software. The PLC control software managing part 133 may perform may receive state information of each of the input/output modules 200 therefrom, and perform a logic corresponding to the state information by using the state information, and generate control information for controlling the input/output module 200 according to a result of the performed logic. The PLC control software managing part 133 may transmit the generated control information of the input/output modules 200 to the input/output modules 200, and control the field devices disposed in the industrial site, through the input/output modules 200.

The PLC control software managing part 133 may be included in the main software managing part 131. The PLC control software may be included in the main software or be separated therefrom.

The PLC control software managing part 133 may transmit and receive data to and from the main software managing part 131.

Each of the input/output modules 200 may perform the VMEbus slave function on the main module 100 performing the VMEbus master function.

Each of the input/output modules 200 may receive state information of field devices disposed in an industrial site and transmit the state information to the main module 100.

Each of the input/output modules 200 may receive logic performance result information obtained by performing a logic corresponding to state control information of a field device, from the main module 100, and provide the logic performance result information to the field device connected to the input/output module 200.

Each of the input/output modules 200 may include a VMEbus decoder 210 and a dual port RAM (DPRAM) 230.

The VMEbus decoder 210 may decode data transmitted through a VMEbus structure 310 of the backplane board 300.

The DPRAM 230 may read or write data decoded at the VMEbus decoder 210.

The backplane board 300 support the VMEbus structure 310. The backplane board 300 may be a backplane printed circuit board (PCB). The backplane board 300 may support a peripheral component interconnect (PCI) bus structure 330.

According to the embodiment illustrated in FIG. 1, a PLC control logic of the remote terminal device 10 may be configured as a function of the main software. When the PLC control logic is configured as a software type logic, the PLC control logic has no hardware configuration part, thereby saving costs. However, the PLC control logic may depend on specifications of the remote terminal device 10 such as a memory capacity and a processing speed of a hardware processor. A PLC control function requires a processing speed in which an output-to-input time is shorter than a millisecond level, which may affect a performance of the main software of the remote terminal device 10.

In addition, a margin such as a program memory or an operation memory should be considered according to addition of software. That is, even when the PLC control logic is configured as a software type logic, hardware components of the remote terminal device 10 should be considered. For example, when an operation speed and a memory margin are insufficient, a high level main module is needed, which increases costs.

Thus, a method of constructing a PLC control function module, which keeps a VMEbus data bus method adopted and used in the remote terminal device 10 and has an independent hardware structure, may be more effective to provide the PLC control function without affecting a hardware performance of the remote terminal device 10.

Hereinafter, a remote terminal device 20 using a method of constructing a PLC control function module, which keeps a VMEbus data bus method and has an independent hardware structure, will now be described according to another embodiment.

Figure 2:
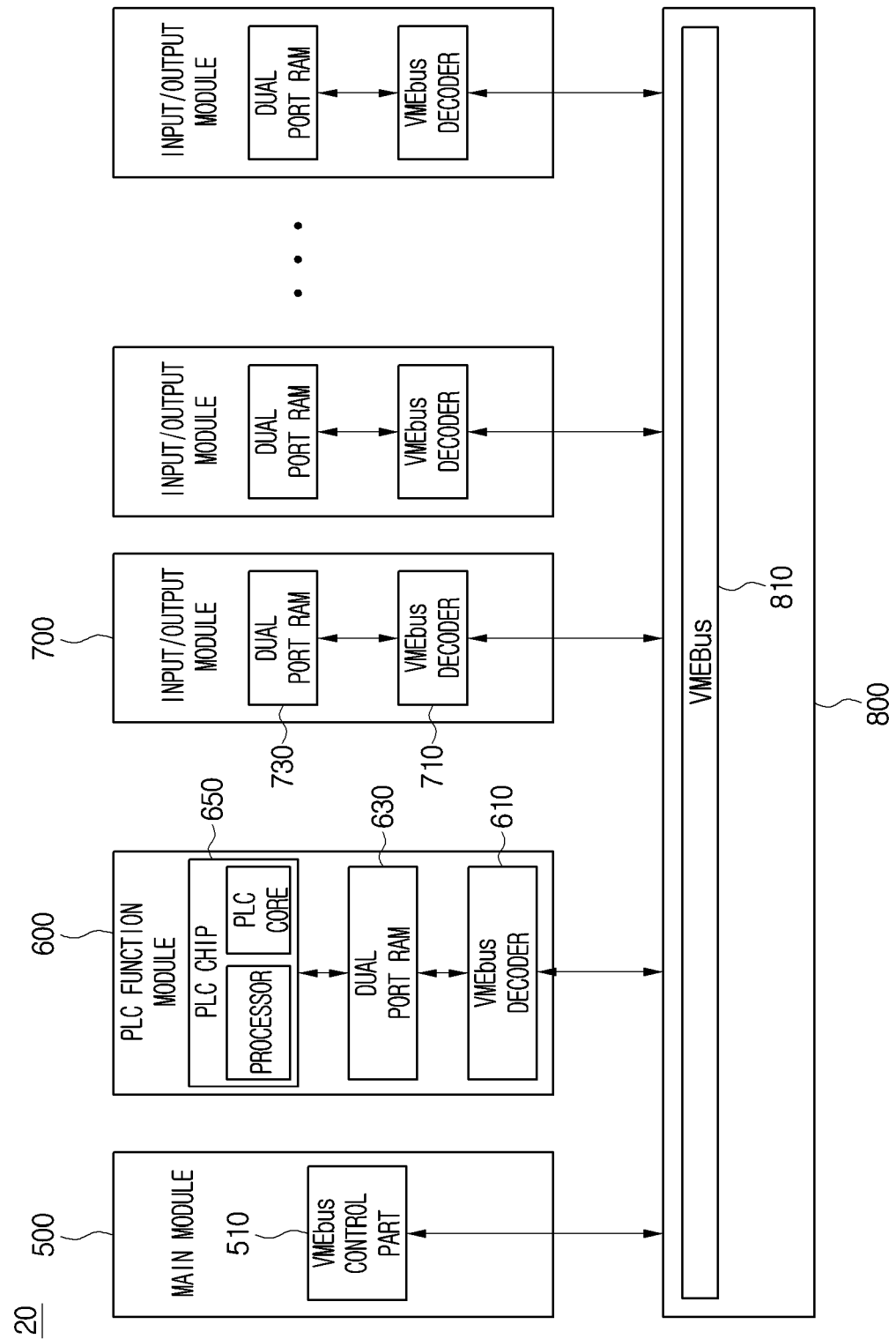
FIG. 2 is a block diagram illustrating a configuration of a remote terminal device according to an embodiment.

FIG. 2 is a block diagram illustrating a configuration of a remote terminal device according to another embodiment.

In particular, the remote terminal device 20 according to the current embodiment may include a PLC function module 600 keeping the VMEbus data bus method and having an independent hardware structure.

Referring to FIG. 2, the remote terminal device 20 may include a main module 500, the PLC function module 600, a plurality of input/output modules 700, and a backplane board 800.

Hereinafter, a detailed description of the same part as that of FIG. 1 will be omitted.

The main module 500 may include a VMEbus control part 510. The VMEbus control part 510 may sense a collision between buses.

The main module 500 may receive control logic information from the input/output modules 700. According to an embodiment, the control logic information may include state information about states of field devices disposed in an industrial site. The input/output modules 700 communicate with a plurality of field devices and receive state information from the field devices, respectively. Each of the input/output modules 700 may receive the state information of the field device and transmit the state information to the main module 500.

The main module 500 may write the received control logic information on an input variable area of a DPRAM 630 of the PLC function module 600. The DPRAM 630 of the PLC function module 600 may include two memory areas. The two memory areas may be the input variable area and an output variable area. The input variable area may be an area for reading the control logic information written by the main module 500. The output variable area may be an area for writing a performance result of a logic corresponding to a value of an input variable stored in the input variable area.

The PLC function module 600 may include a VMEbus decoder 610, the DPRAM 630, and a PLC chip 650.

The VMEbus decoder 610 may decode data transmitted through a VMEbus structure 810 of the backplane board 800.

The DPRAM 630 may read or write data decoded at the VMEbus decoder 610. The DPRAM 630 may include a plurality of memory areas. The DPRAM 630 will be described later in detail with reference to FIG. 3.

The PLC chip 650 may include a processor 651 and a PLC core 653.

The processor 651 may function as a mediator between the PLC core 653 and the DPRAM 630. The processor 651 may set the memory areas of the DPRAM 630 such that a plurality of input/output variables correspond to the memory areas included in the DPRAM 630, respectively. In addition, the processor 651 may set each of the input/output variables to be changed.

The PLC core 653 may be a chipset for supporting IEC61131-3.

The PLC chip 650 may read a value of an input variable written on the input variable area of the DPRAM 630.

The PLC chip 650 may perform a preset logic corresponding to the read value of the input variable by using the read value of the input variable. According to an embodiment, the PLC chip 650 may store a plurality of values of input variables and a plurality of logic values. The values of the input variables may correspond to the logic values, respectively. The PLC chip 650 may identify a read value of an input variable and search for a logic value corresponding to the identified value of the input variable to perform a logic corresponding to the searched for logic value.

The PLC chip 650 of the PLC function module 600 may write a result of the performed logic on the output variable area of the DPRAM 630.

The main module 500 may read a value of an output variable on the output variable area of the DPRAM 630. The main module 500 may use the read value of the output variable to control a field device to perform an operation corresponding to the read value of the output variable. According to an embodiment, the main module 500 may transmit control information corresponding to the read value of the output variable, to any one of the input/output modules 700, and the input/output module 700 receiving the control information may transmit the control information to the field device. An operation of the field device may be controlled according to the control information.

Each of the input/output modules 700 may perform a VMEbus slave function on the main module 500 performing a VMEbus master function.

Each of the input/output modules 700 may receive state information of field devices disposed in an industrial site and transmit the state information to the main module 500.

Each of the input/output modules 700 may receive logic performance result information obtained by performing a logic corresponding to state control information of a field device, from the main module 500, and provide the logic performance result information to the field device connected to the input/output module 700.

Each of the input/output modules 700 may include a VMEbus decoder 710 and a DPRAM 730.

The VMEbus decoder 710 may decode data transmitted through the VMEbus structure 810 of the backplane board 800.

The DPRAM 730 may read or write data decoded at the VMEbus decoder 710.

The backplane board 800 support the VMEbus structure 810. The backplane board 800 may be a backplane printed circuit PCB. The backplane board 800 may support only the VMEbus structure 810 and may not support a PCI bus structure.

Figure 3:
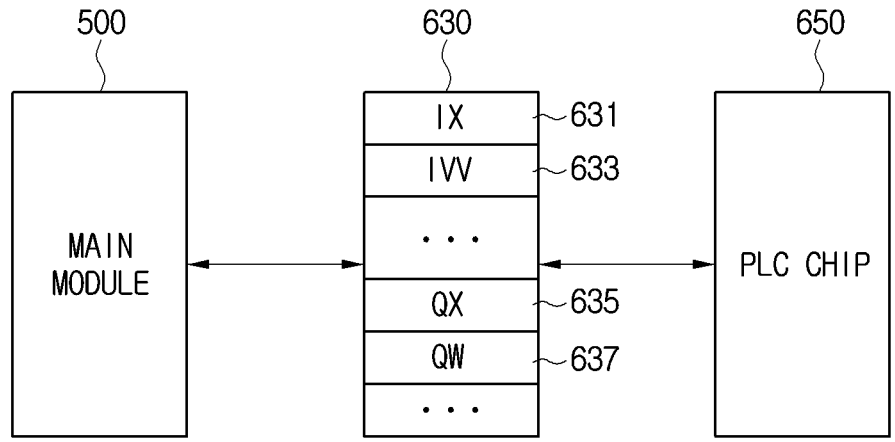
FIG. 3 is a view illustrating a configuration of memory areas of a DPRAM included in a PLC function module, according to an embodiment.

FIG. 3 is a view illustrating a configuration of memory areas of the DPRAM 630 included in the PLC function module 600, according to an embodiment.

Referring to FIG. 3, the DPRAM 630 may include a plurality of memory areas. The memory areas may include a first input variable area 631, a second input variable area 633, a first output variable area 635, and a second output variable area 637.

I, Q, X, and W of FIG. 3 may denote an input variable, an output variable, a bit variable, and a word variable, respectively. Each of the memory areas may correspond to any one of an input bit variable IX as a combination of the input variable and the bit variable, an input word variable IW as a combination of the input variable and the word variable, an output bit variable QX as a combination of the output variable and the bit variable, and an output word variable QW as a combination of the output variable and the word variable.

A value of the input bit variable IX may be read or written on the first input variable area 631.

A value of the input word variable IW may be read or written on the second input variable area 633.

A value of the output bit variable QX may be read or written on the first output variable area 635.

A value of the output word variable QW may be read or written on the second output variable area 637.

The PLC chip 650 may set the memory areas included in the DPRAM 630 to correspond to a plurality of input/output variables, respectively.

Figure 4:
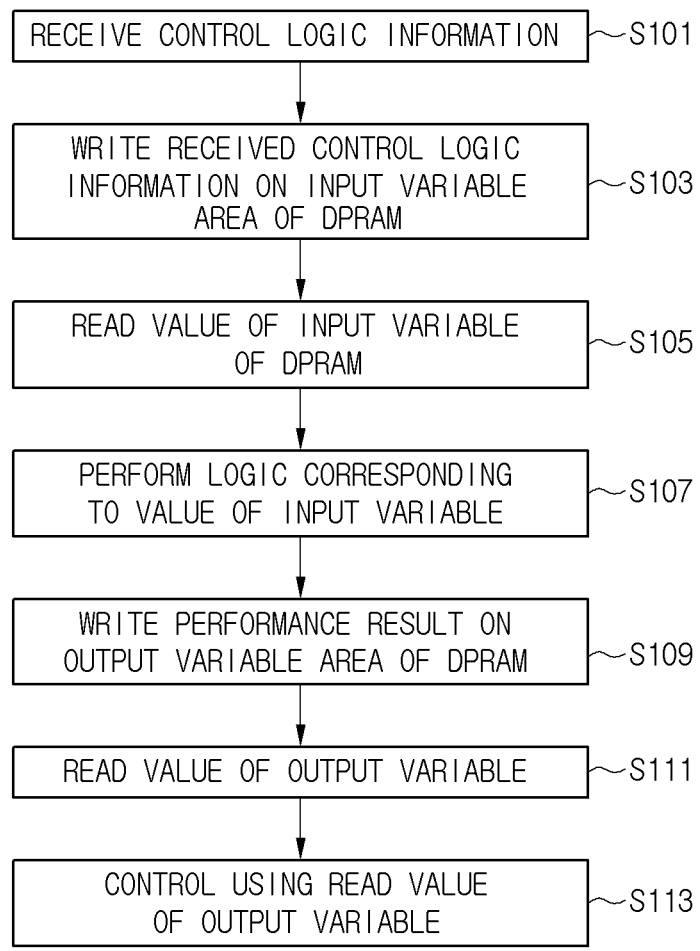
FIG. 4 is a flowchart illustrating a method of operating a remote terminal device according to an embodiment.

FIG. 4 is a flowchart illustrating a method of operating a remote terminal device according to an embodiment.

Referring to FIG. 4, the main module 500 receive control logic information from the input/output modules 700 (S101). According to an embodiment, the control logic information may include state information about states of field devices disposed in an industrial field. The input/output modules 700 may communicate with the field devices and receive the state information from the field devices, respectively. Each of the input/output modules 700 may receive the state information of the field device and transmit the state information to the main module 500.

The main module 500 writes the received control logic information on an input variable area of the DPRAM 630 of the PLC function module 600 (S103). The DPRAM 630 of the PLC function module 600 may include two memory areas. The two memory areas may be the input variable area and an output variable area. The input variable area may be an area for reading the control logic information received from the main module 500. The output variable area may be an area for writing a performance result of a logic corresponding to a value of an input variable stored in the input variable area.

The PLC chip 650 of the PLC function module 600 reads the value of the input variable written on the input variable area of the DPRAM 630 (S105).

The PLC chip 650 of the PLC function module 600 performs a preset logic corresponding to the read value of the input variable by using the read value of the input variable (S107). According to an embodiment, the PLC chip 650 may store a plurality of values of input variables and a plurality of logic values. The values of the input variables may correspond to the logic values, respectively. The PLC chip 650 may identify the read value of the input variable and search for a logic value corresponding to the identified value of the input variable to perform a logic corresponding to the searched for logic value.

The PLC chip 650 of the PLC function module 600 writes a result of the performed logic on the output variable area of the DPRAM 630 (S109).

The main module 500 reads a value of an output variable on the output variable area of the DPRAM 630 (S111).

The main module 500 uses the read value of the output variable to control a field device to perform an operation corresponding to the read value of the output variable (S113). According to an embodiment, the main module 500 may transmit control information corresponding to the read value of the output variable, to any one of the input/output modules 700, and the input/output module 700 receiving the control information may transmit the control information to the field device. An operation of the field device may be controlled according to the control information.

According to an embodiment, the control information may include information for process control, sequence control, and group control between device groups, but is not limited thereto. Thus, the control information may include various types of information for controlling an operation of a field device disposed in an industrial site.

According to an embodiment, the above-described method can be embodied as processor readable codes on a program-recorded medium. Examples of a processor readable medium include read-only memory (ROM), random-access memory (RAM), CD-ROMs, magnetic tapes, floppy disks, optical data storage devices, and carrier waves (such as transmission through the Internet).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A remote terminal device having an industrial versa module eurocard bus (VMEbus) structure and comprising:
   a main module configured to receive control logic information related to a field device from an input/output module; and
   a programmable logic controller (PLC) function module;
   wherein the PLC function module is configured to:
      receive the control logic information from the main module;
      perform logic corresponding to the control logic information; and
      output a result of the performed logic,
   wherein the PLC function module comprises:
      a dual port RAM including a plurality of memory areas each including an input variable area and an output variable area; and
      a PLC chip configured to read the control logic information written in one of the plurality of memory areas, perform logic corresponding to the read control logic information, and output the result of the performed logic to another one of the plurality of memory areas,
   wherein, the PLC chip is configured to:
      store a plurality of values of input variables each of which corresponds to one of a plurality of logic values;
      read a value of an input variable from an input variable of the dual port RAM;
      search for a logic value corresponding to the input variable;
      perform logic corresponding to the logic value; and
      write a result of the performed logic in an output variable area of the dual port RAM, and
   wherein the main module is further configured to:
      read a value of an output variable from an output variable area of the dual port RAM; and
      control the field device to perform an operation corresponding to the read value of the output variable.

2. The remote terminal device according to claim 1, wherein:
   each input variable area includes a first input variable area in which a value of an input bit variable is read or written and a second input variable area in which a value of an input word variable is read or written; and
   each output variable area includes a first output variable area in which a value of an output bit variable is read or written and a second output variable area in which a value of an output word variable is read or written.

* * * * *